United States Patent [19]

Fresard et al.

[11] Patent Number: 4,649,608
[45] Date of Patent: Mar. 17, 1987

[54] MACHINE FOR WORKING MATERIALS SUCH AS WOOD, METAL AND PLASTIC

[75] Inventors: Marcel Fresard, Petit-Lancy; Francis Plomb, Le Lignon; Pierre Court, Geneva, all of Switzerland

[73] Assignee: Mefina S.A., Fribourg, Switzerland

[21] Appl. No.: 694,517

[22] PCT Filed: May 2, 1984

[86] PCT No.: PCT/CH84/00067
  § 371 Date: Dec. 21, 1984
  § 102(e) Date: Dec. 21, 1984

[87] PCT Pub. No.: WO84/04484
  PCT Pub. Date: Nov. 22, 1984

[30] Foreign Application Priority Data
  May 6, 1983 [CH] Switzerland ............ 2474/83

[51] Int. Cl.⁴ .................................... B23P 23/02
[52] U.S. Cl. .................... 29/26 A; 29/560; 408/20
[58] Field of Search ............ 408/20, 21, 24; 29/560, 29/26 A; 83/574; 144/35 R

[56] References Cited

U.S. PATENT DOCUMENTS

| 2,501,134 | 3/1950 | Meckoski | 144/35 R |
| 2,604,127 | 7/1952 | Grzybowski | 144/35 R |
| 2,784,752 | 3/1957 | Emrick | 408/20 |
| 2,835,289 | 5/1958 | Rockwell | 408/20 |
| 2,999,519 | 9/1961 | Petersen | 408/20 |
| 3,118,261 | 1/1964 | Glaude | 408/20 |
| 3,299,918 | 1/1967 | Howey | 29/560 |
| 3,387,638 | 6/1968 | West | 408/20 |
| 3,410,326 | 11/1968 | Paquin | 408/20 |
| 4,349,945 | 9/1982 | Fox | 408/20 |

Primary Examiner—Gil Weidenfeld
Assistant Examiner—Daniel W. Howell

[57] ABSTRACT

In an upper arm (1) is mounted a spindlehead (5) and in a lower frame two power takeoffs (16, 38). An electric motor (6) drives either a spindle (68) or the power takeoffs (16, 38) in rotation.

Thus, the operations of milling, scroll cutting, sanding, grinding, polishing, sawing, etc., can be performed from the upper arm or the power takeoffs of the lower frame of the machine.

12 Claims, 16 Drawing Figures

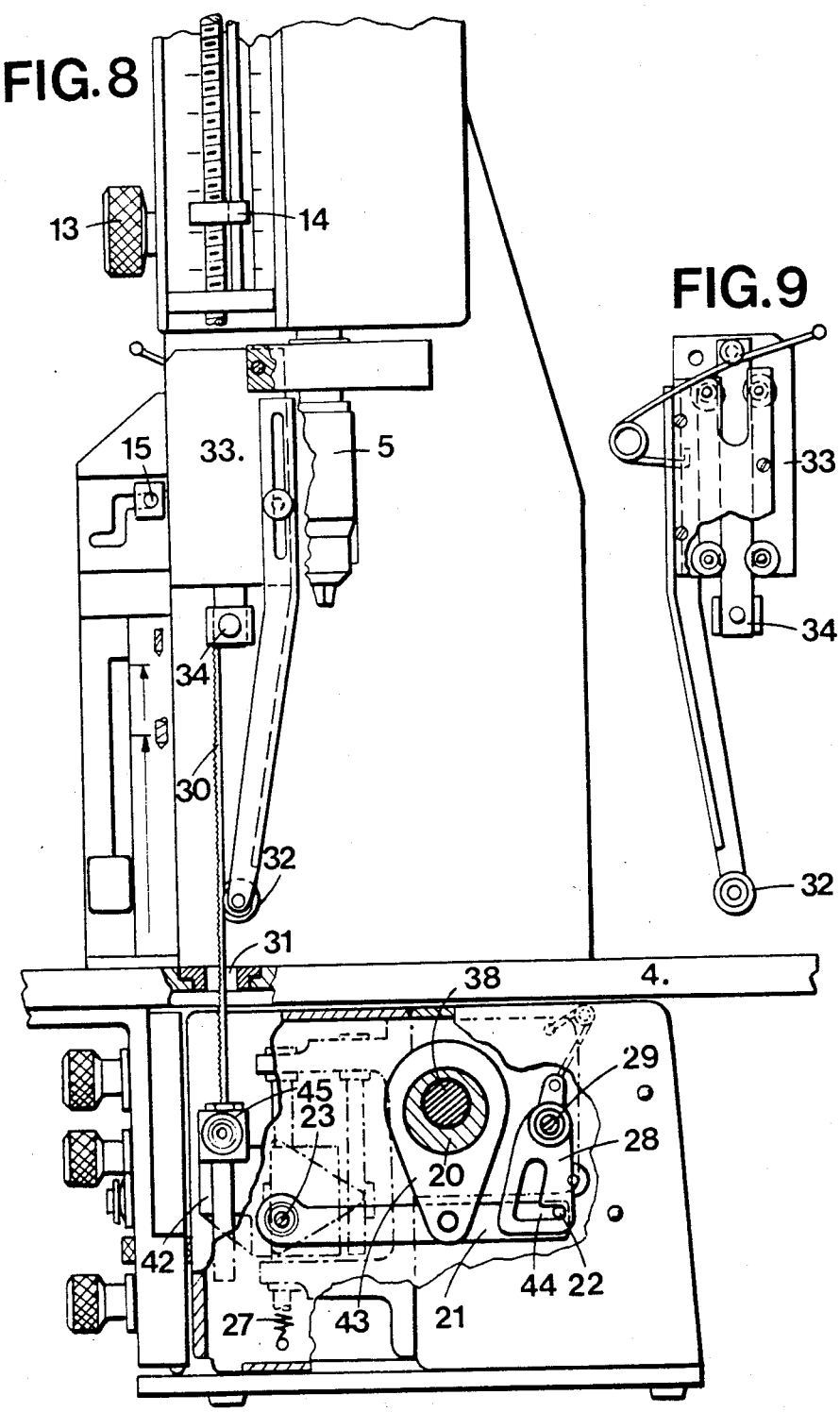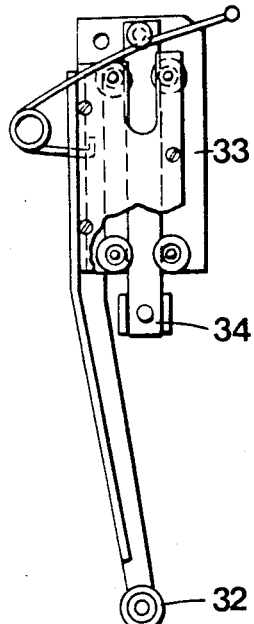

MACHINE FOR WORKING MATERIALS SUCH AS WOOD, METAL AND PLASTIC

The invention has as its object a machine for working materials such as wood, metal and plastic, intended more particularly for hobbyists and model makers and occupying a small space.

Machines of this type are already known, comprising a circular saw, driven by an electric motor, mounted on a base with a table that can be tilted and adjusted in height. It is possible to replace the circular saw blade with an accessory for cutting molds, slotting, drilling, grooving, polishing, sanding, straightening or planing. Electric drills are also known, which are mounted on supports and able to drive vertical shapers, milling cutters, sanders and other accessories in rotation.

The machine according to the invention, which makes it possible to group a larger number of operations in small space, is characterized in that it comprises an upper arm in which a first rotating element is mounted, an upright in which an electric motor is placed and a lower frame in which a second rotating element is mounted, the motor being intended to drive either element in rotation.

The accompanying drawing shows an embodiment of the machine according to the invention diagrammatically and by way of example.

FIG. 8 is another view in cross section of the lower frame, showing driving of a scroll saw.

FIG. 9 shows the support and return element of the scroll saw.

Figure 1:
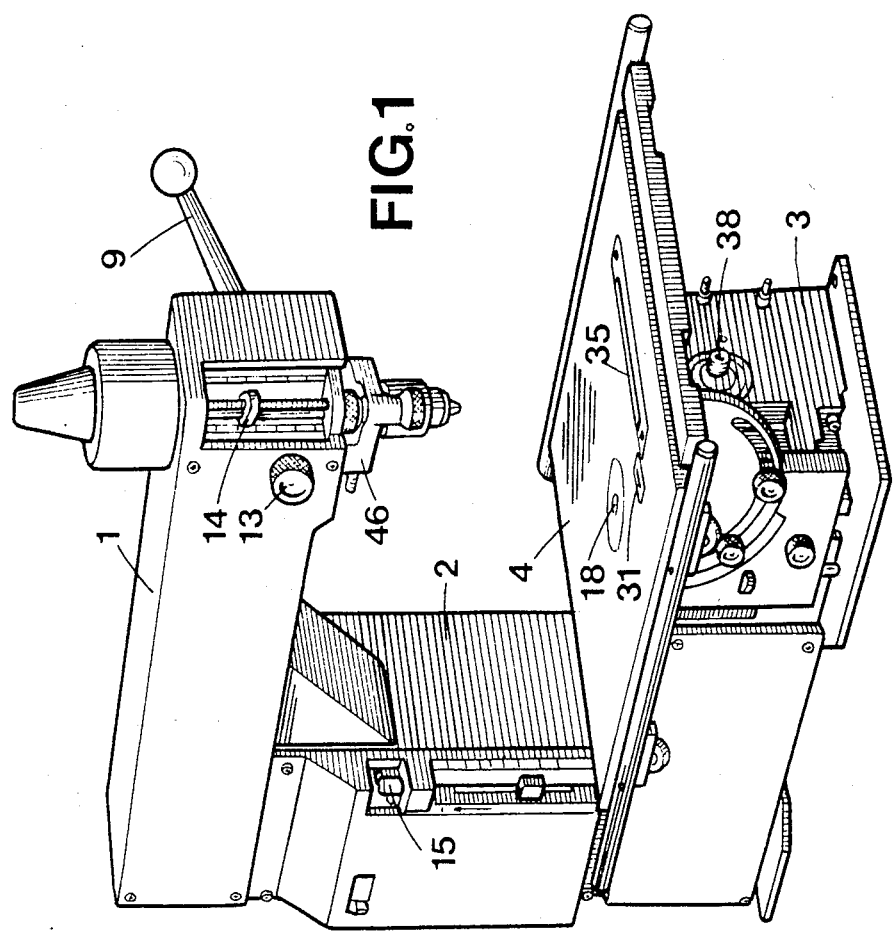
FIG. 1 is a general perspective view.
Figure 2:
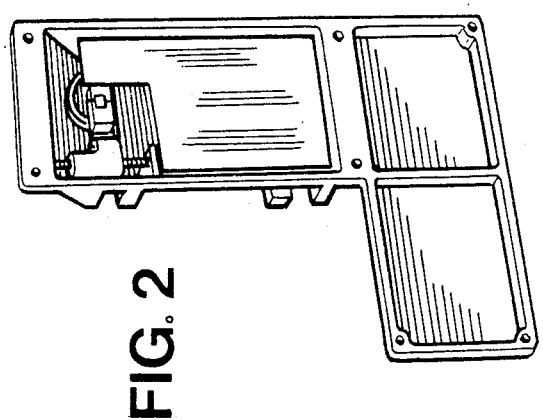
FIG. 2 shows the inside face of the wall applied against the lower frame and upright of the machine, shown in FIG. 1.
Figure 3:
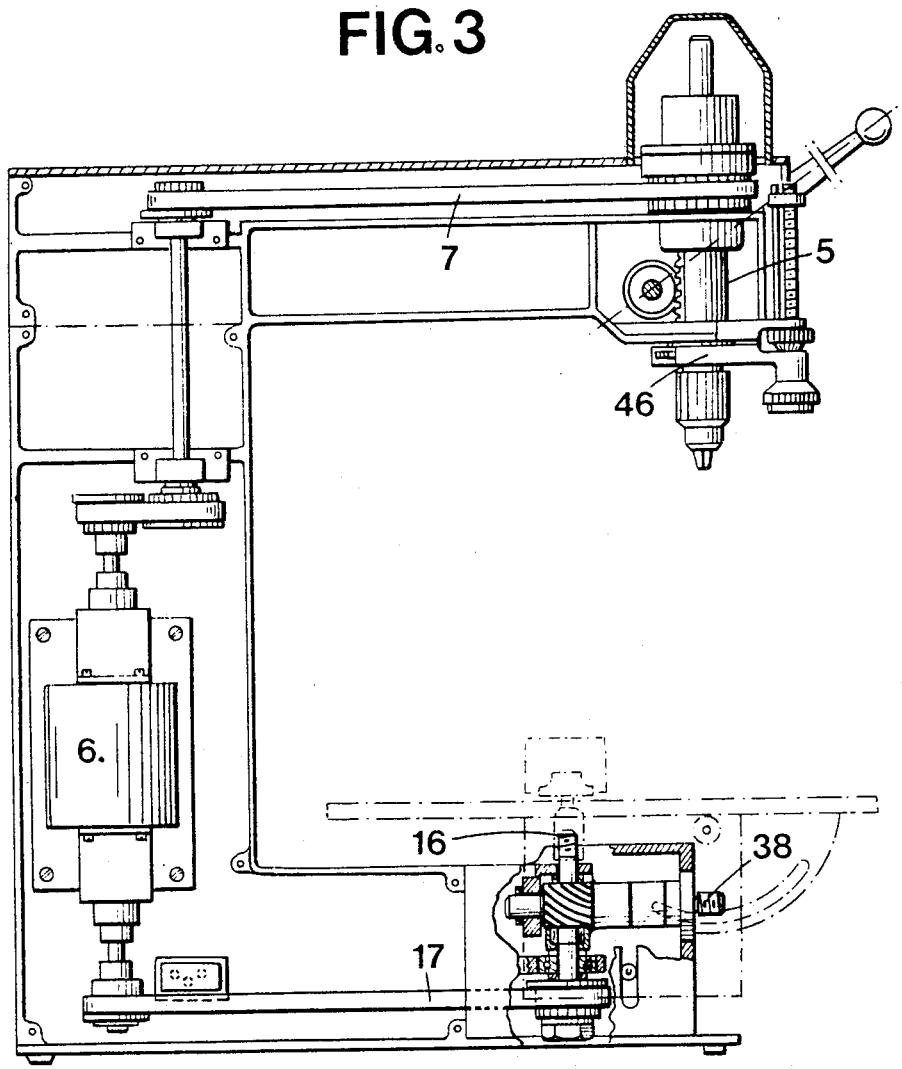
FIG. 3 is a general view in longitudinal section of the machine shown in FIG. 1.
Figure 4:
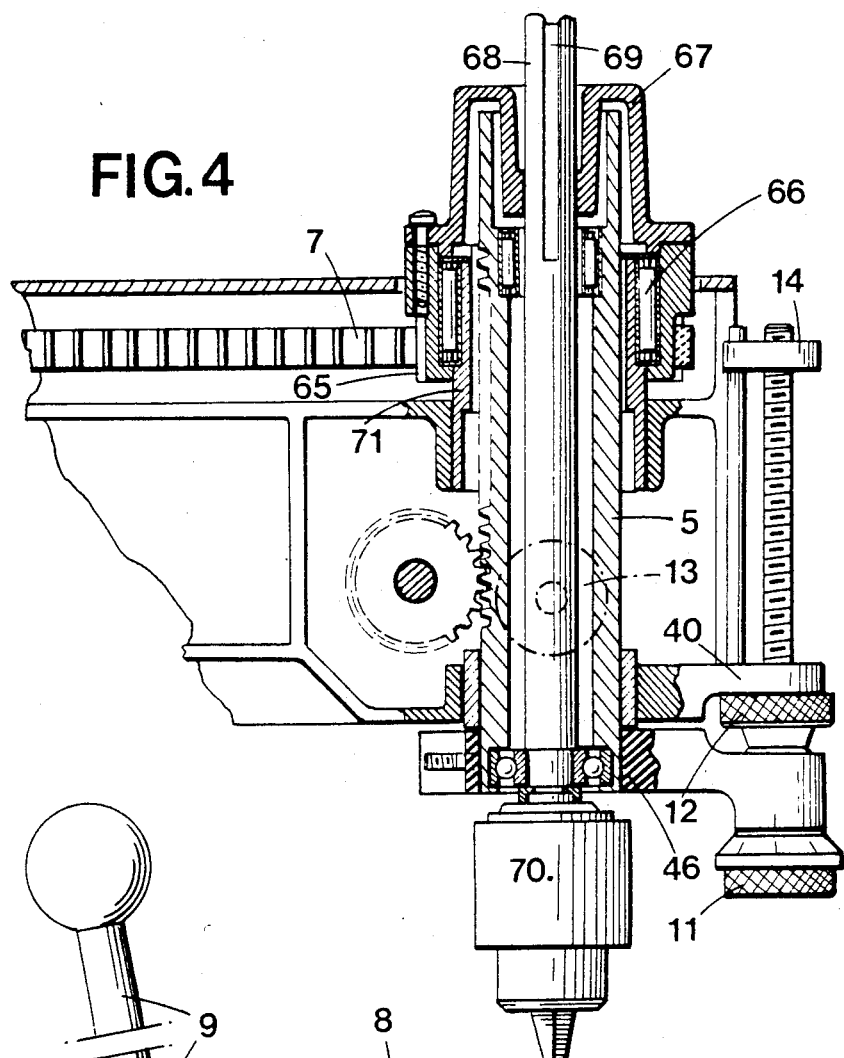
FIG. 4 is a partial view on a larger scale and partially in section of the upper arm of the machine shown in FIG. 3.
Figure 5:
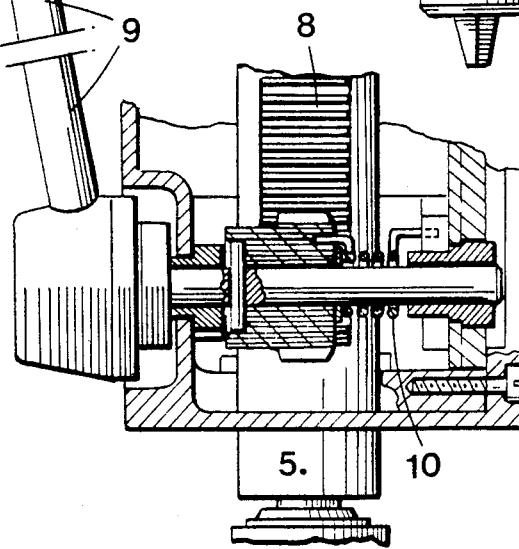
FIG. 5 is a partial view in cross section of FIG. 4.

The machine shown in FIG. 1 comprises an upper arm 1, an upright 2 and a lower frame 3 on which a plate 4 is mounted. As shown in longitudinal section in FIGS. 3 and 4, a spindlehead is mounted vertically in the upper arm. A spindle or rotating element 68 is driven in clockwise rotation from an electric motor 6 within the upright 2 by a drive belt 7. Rack device 8 for controlling the ascending and descending movements of spindle holder 5 is operated by a control lever 9 against the action of a return spring 10, as shown in FIG. 5. This device also comprises a knurled nut 11 limiting the descending travel of spindlehead 5 by a mobile stop 14 and a knurled nut 12 limiting its ascending travel by a stop 40 solid with upper arm 1.

Driving of spindle 68 of a toolholder 70 is done by means of a first sleeve 67 forming a belt pinion 65 mounted on a needle bearing 66 solid with a second sleeve 71 belonging to upper arm 1. First sleeve 67 exhibits at least a key engaged in a groove 69 of spindle 68.

A current reverser 15 makes it possible to rotate counterclockwise a first takeoff or rotating element 16, mounted vertically in the lower frame from an electric motor 6 by a drive belt 17. This power takeoff 16, which is under a circular orifice 18 of plate 4, is intended to receive and rotate tools such as milling cutters, shapers, sanders, grinding wheels, etc. when the plate is in horizontal position. Moreover, it meshes with a second power takeoff or rotating element 38, oriented at right angles and projecting at the end of lower frame 3. This power takeoff 38 is used to drive a circular saw 19, shown in mixed lines in FIGS. 6 and 7 or any other tool such as a sanding disk, grinding wheels, etc., or other accessories such as a flexible cable, for example.

Figure 6:
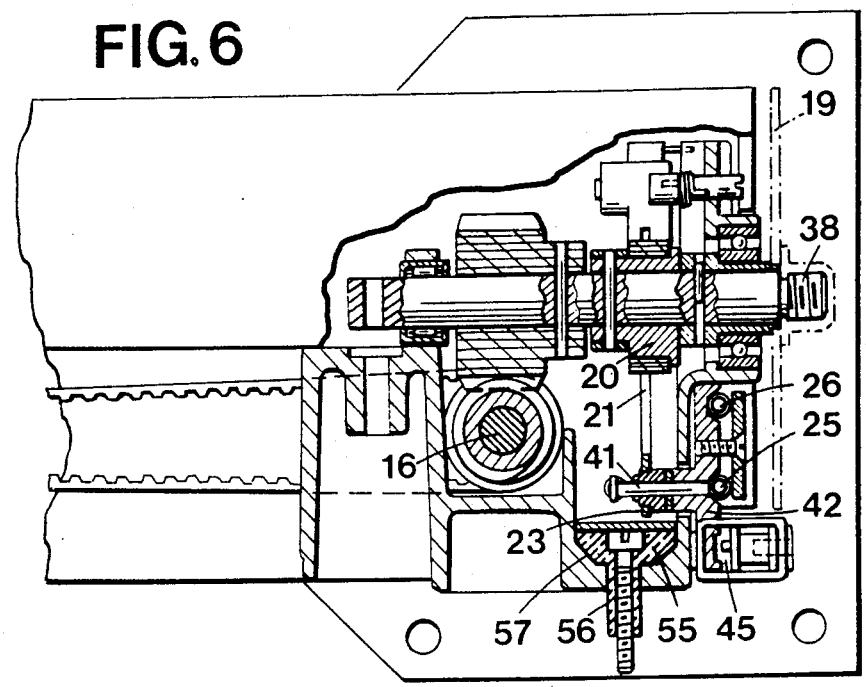
FIG. 6 is a partial view in horizontal section with tear-aways of the lower frame of FIG. 3 on a larger scale.
Figure 7:
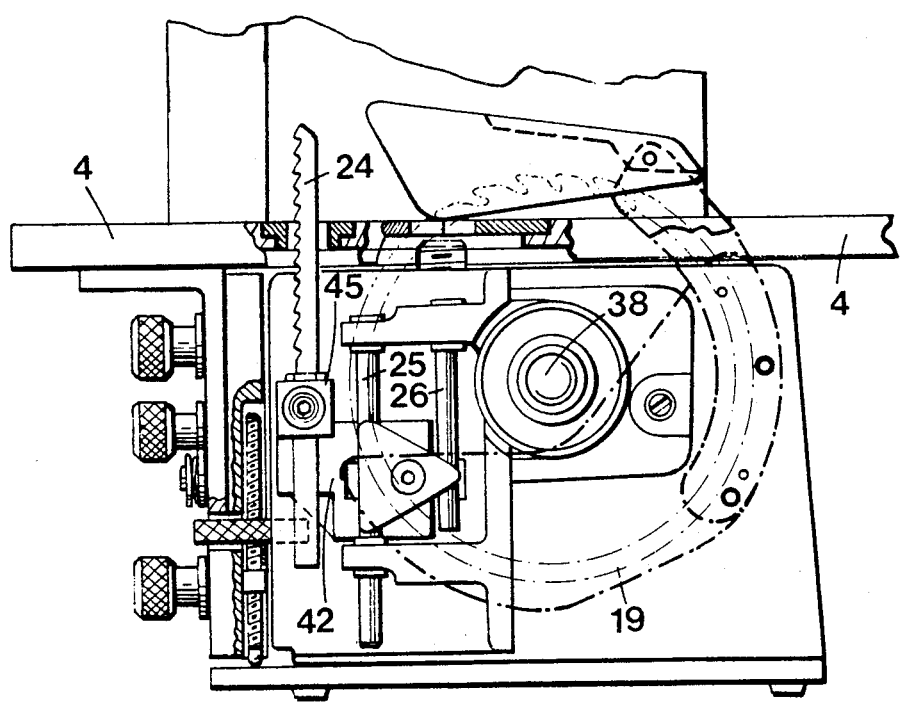
FIG. 7 is a view in cross section of the lower frame, showing driving of a saber saw.

An eccentric 20, on the shaft of power takeoff 38 as shown in FIGS. 6, 7 and 8, is connected to a lever 21 by a connecting rod 43. Lever 21 is provided at one of its ends with a pivot 22 which, when it is engaged in the horizontal part of an L-shaped slot 44 of a rocker 28, assures angular reciprocating movement of its other end provided with a pivot 23. This pivot 23 is hinged on a shaft 41 solid with a displaceable support 42 to which a blade of a saber saw 24 can be fastened. Support 42 is made solid with parallel bars 25, 26 mounted to slide vertically at the end of lower frame 3 to drive saber saw 24 in a vertical reciprocating movement.

According to a variant, the blade of saber saw 24 can be rotated on support 42 and subjected to the action of an eccentric controlled by the second power takeoff 38. Thus, an orbital movement is imparted to the blade of saw 24 during its reciprocating drive by support 42, to facilitate the disengagement of the blade of saw 24 at the end of cutting.

As also shown in FIG. 8, saber saw 24 can be replaced by a scroll saw 30. In both cases, the saw goes through a slot 31 of plate 4. Scroll saw 30 rests against a small wheel 32 belonging to guide device 33, fastened to spindlehead 5. When a blade of a scroll saw 30 is mounted on the machine, it is fastened by a fastening flange 45 at one end to support 42 and at the other end to an elastic return element 34 mounted in guide device 33 made solid with support 46 by knurled nuts 11, 12 of spindlehead 5. Guide device 33 can also be useful in holding saber saw 24 in its working position. In both cases, this guide device can also serve as a support for the material to be cut.

According to a variant, the elastic return element 34 is engaged in the upright 2 of upper arm 1 of the machine and connected to the end of a first lever arm hinged in upper arm 1 of the machine and connected by the end of a second arm of this lever to the end of the saw blade opposite the one which is connected to support 42.

As shown in the drawing, a device for adjusting the height of small wheel 32 makes it possible to lay the material flat on plate 4.

When rocker 28 is made to turn counterclockwise on its pivot 29, for example by means of a screwdriver whose blade is inserted in a groove exhibited by pivot 29, pivot 22 of arm 21 is engaged in the vertical part of L-shaped slot 44. Thus, the vertical reciprocating movement of saw 24, or 30 is interrupted, pivot 23 being held in low position by a spring 27 and pivot 22 moving upward and vice versa in the vertical part of L-shaped slot 44 when arm 21 is driven by eccentric 20.

Figure 10:
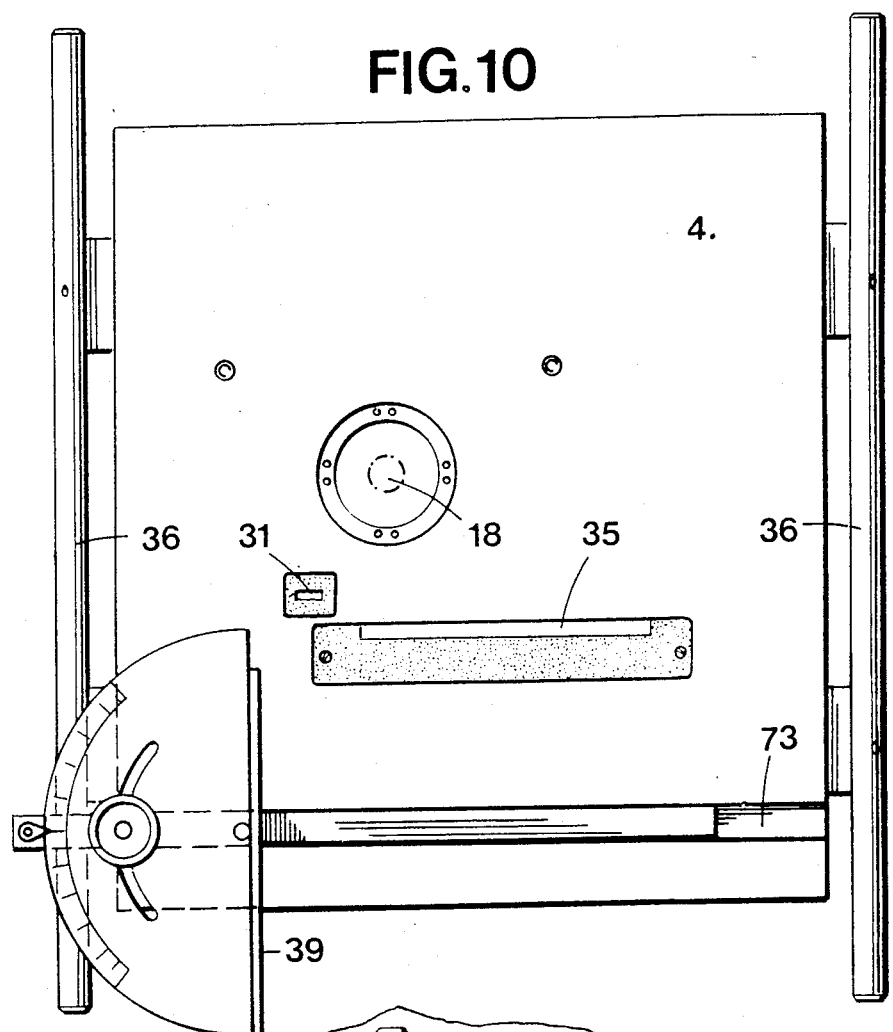
FIG. 10 is a top view of the plate.
Figure 12:
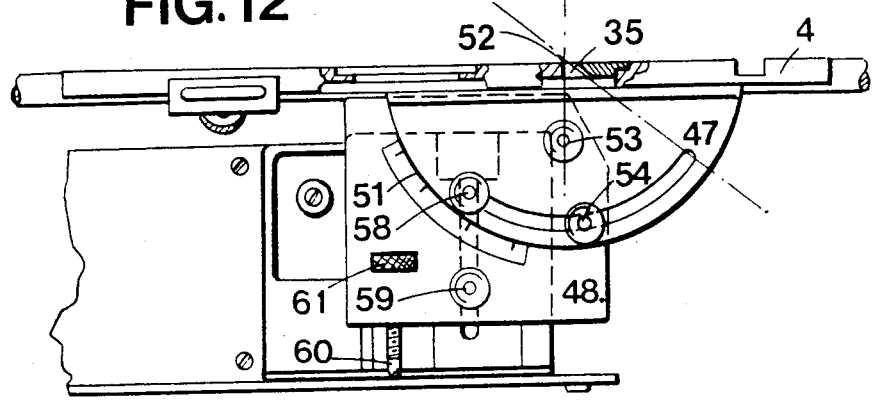
FIG. 12 is a partial elevation view of the lower frame of the machine shown in FIG. 1.

As shown in FIGS. 1, 10 and 12, plate 4 is mounted to pivot around a virtual axis 52 corresponding approximately to the left edge of slot 35 allowing passage of circular saw 19 to make sawing in a tilted position of plate 4 possible.

To do this, the lower face of plate 4 is made solid with a bracket 47 whose part at right angles with plate 4 is applied against a vertical support 48. A curved slot 49, made in the wall of vertical support 48 in which a sliding block 50 is engaged, provides guiding of bracket 47 on a curved slide 51 of vertical support 48. The curve of slot 49 and curved slide 51 of vertical support 48 have virtual axis 52 as their common center. The angular position chosen for plate 4 is assured, on the one hand, by locking of sliding block 50 in slot 49 by a nut 53 and, on the other hand, by locking of bracket 47 against suport 48 with nut 54.

Figure 13:
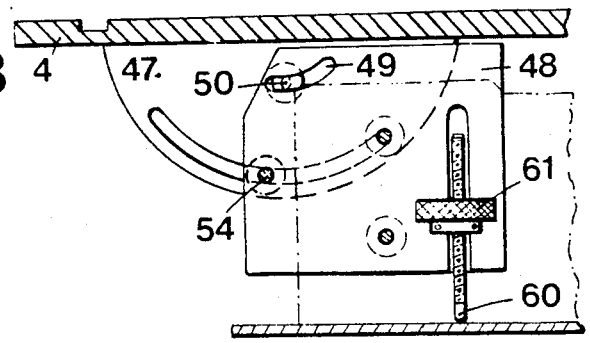
FIG. 13 shows a detail in partial section of the elements for adjusting the positions of the plate.

On the other hand, as shown in FIGS. 6, 12 and 13, a sliding block 55, provided with a pair of guide dowels 56, is engaged in a slide 57 of lower frame 3. Vertical support 48 exhibits two bores engaged on a pair of dowels 56. It is thus possible to move plate 4 in height and fasten it at the selected height by nuts 58, 59 screwed on the threaded ends of dowels 56. A stop 60 for adjusting the height of plate 4, controlled by a knurled nut 61, makes it possible to adjust the level of plate 4. To provide drive elements 16 or 38 of lower frame 3 with various accessories, it may be necessary first to remove plate 4 and its vertical support 48 from lower frame 3. When plate 4 is being put back in place, stop 60 makes it possible to put it back in its previous position.

Figure 14:
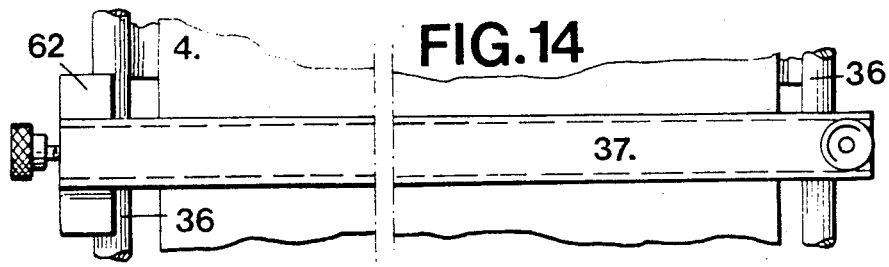
FIG. 14 is a partial top view of the plate, showing a guide fastened to the guide bars of the plate.
Figure 15:
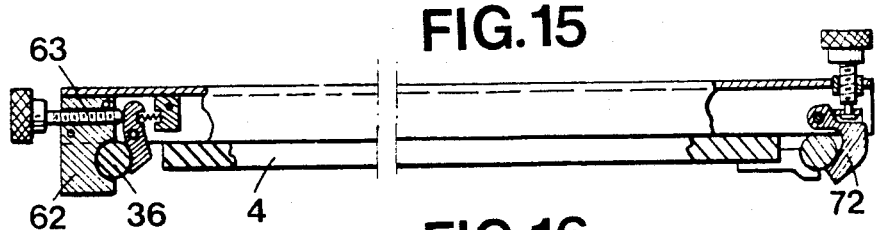
FIG. 15 is a view in longitudinal section showing the fastening of the guide to the guide bars.
Figure 16:
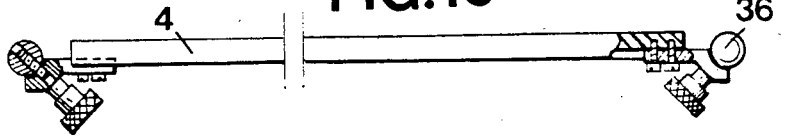
FIG. 16 is a view of the plate in longitudinal section, showing fastening of the guide bars.

As shown in FIGS. 14 to 16, a guide 37 exhibits at one of its ends an orientation and simultaneous positioning device, strictly at right angles with a guide bar 36 solid with an edge of plate 4. It consists in making a support plate 62 flat against guide bar 36 during locking of a screw 63 operating a locking rocker 64. The final position of guide 37 is thus assured by simple locking of another fastening element 72 to bar 36 solid with the opposite edge of plate 4. Guide bars 36 are detachably fastened along the edges of plate 4.

As shown in FIG, 10, a groove 73 has been provided in plate 4 to allow the use of a miter gauge 39.

Figure 11:
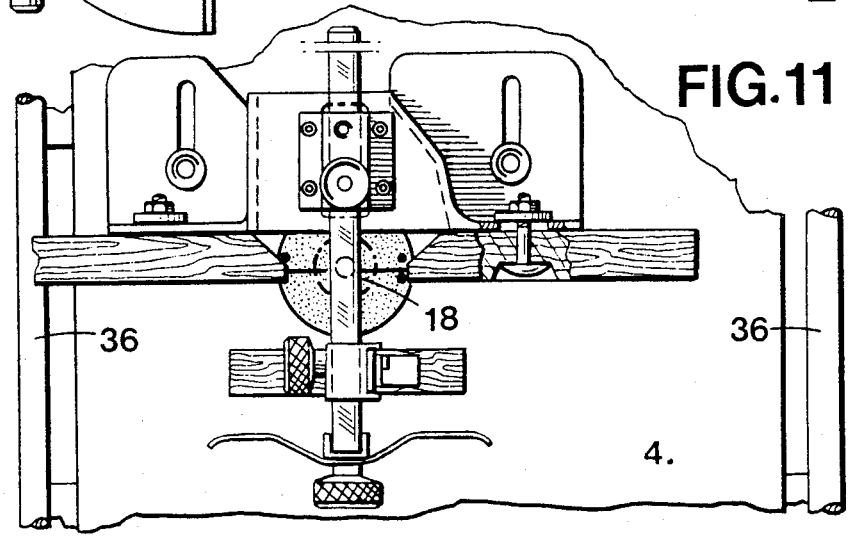
FIG. 11 shows a guide and protection element during milling and scroll cutting.

As shown in FIG. 11, an adjustable protective and guide device has been provided to be fastened to plate 4 for such operations as milling, scroll cutting, etc., driven by power takeoff 16.

We claim:

1. A machine for working materials including, a lower frame, an upright joined at one end to said lower frame, an upper arm overlying said lower frame in a spaced manner and joined to said upright, said upper arm, upright and lower frame defining a unitary rigid assembly with said upper arm maintained fixedly disposed relative said lower frame, a first rotating element carried by said upper arm and having an end face opposed to said lower frame, a second rotating element carried by said lower frame and having an end face opposed to said upper arm, a third rotating element carried by said lower frame and extending substantially horizontally from said lower frame, a motor disposed within said upright, driving means within said upright, upper arm and lower frame connecting said motor to said first and second rotating elements to rotate same, and means connecting said third and second rotating elements whereby said driving means rotating said second element in turn rotates said third element, a plate superposed on said lower frame and having an orifice, a bracket extending at righ angles from beneath said plate, a curved base on said bracket, a vertical support on said lower frame having a curved slide, said curved base adapted to slide on said curved slide, a sliding block solid with said bracket, said vertical support having a curved notch engaged by said sliding block, and said curved slide and curved notch having a vertical axis as a common center.

2. Machine according to claim 15, including means for controlling the running direction of said motor.

3. Machine according to claim 1, wherein said first and second rotating elements are vertically disposed and said third rotating element is disposed normal to said first and second rotating elements.

4. Machine according to claim 1 wherein said third rotating element includes an eccentric, a displaceable support adjacent said eccentric, and means joining said eccentric to said support, whereby actuation of said eccentric drives said support in a reciprocating manner.

5. Machine according to claim 4, said joining means including a lever hinged at one end and connecting means on said eccentric for driving said lever in an angular manner, means holding a saber saw, and the other end of said lever transmitting a reciprocating movement to the saber saw.

6. Machine according to claim 4 said joining means including a lever hinged at one end and driven by said eccentric in an angular manner, means holding a scroll saw, and the other end of said lever transmitting a reciprocating movement to the lower end of the scroll saw, a guide device on said upper arm adjacent said first rotating element, an elastic return element mounted in said guide device, and an upper end of said scroll saw attached to said return element.

7. Machine according to claim 1, wherein said first rotating element comprises an adjustable height spindle.

8. Machine according to claim 7, including a rack control lever on said upper arm to provide adjustment of the height of said spindle.

9. Machine according to claim 1, wherein said second rotating element comprises a first power takeoff intended to drive rotary tools of the class including milling cutters, shapers, grinding wheels and sanders, and said tools adapted to be connected to said power takeoff through said orifice.

10. Machine according to claim 9, wherein said plate is provided with a slot therethrough, pivot means allowing said plate to pivot around a virtual axis located at the upper surface of the plate within the confines of said orifice therethrough.

11. Machine according to claim 1, wherein said second rotating element comprises a first power takeoff and said third rotating element comprises a second power takeoff meshing at right angles with said first power takeoff to drive a tool in rotation at the end of said lower frame.

12. A machine for working materials including a lower frame, an upright joined at one end to said lower frame, an upper arm overlying said lower frame in a spaced manner and joined to said upright, said upper arm, upright and lower frame defining a unitary rigid assembly with said upper arm maintained fixedly disposed relative said lower frame, a first rotating element carried by said upper arm and having an end face opposed to said lower frame, a second rotating element carried by said lower frame and having an end face opposed to said upper arm, a third rotating element carried by said lower frame and extending substantially horizontally from said lower frame, a motor disposed within said upright, driving means connecting said motor to said first and second rotating elements to rotate same, and means connecting said third and second rotating elements whereby said driving means rotating said second element in turn rotates said third element, said third rotating element including an eccentric, a displaceable support adjacent said eccentric, means joining said eccentric to said support whereby actuation of said eccentric drives said support in a reciprocating manner, said joining means including a lever hinged at one end and connecting means on said eccentric for driving said lever in an angular manner, means holding a saber saw, said joining means connecting means including a connecting rod joining said eccentric to said lever, said displaceable support joined to said lever at an end opposite said hinged end and adjacent said means holding the saber saw, a rocker having an L-shaped slot defining a base and arm, said lever hinged end including a pivot on said lever engaged within said slot in a selected alternate first and second position as defined by the location of said pivot within said slot, said rocker shiftable to said first position to locate said pivot at the right end of the base of said L-shaped slot whereby said eccentric through said lever drives said support and saber saw in a reciprocating manner, and said rocker shiftable to said second position to locate said pivot within the arm of said L-shaped slot whereby said eccentric drives said pivot in a reciprocating manner without the other end of said lever adjacent said support being driven.

* * * * *